US007930090B2

(12) United States Patent
Weiss et al.

(10) Patent No.: US 7,930,090 B2
(45) Date of Patent: Apr. 19, 2011

(54) METHOD AND DEVICE FOR ADAPTING THE VALVE CHARACTERISTIC OF A FUEL INJECTION VALVE

(75) Inventors: Frank Weiss, Pentling/Grasslfing (DE); Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 210 days.

(21) Appl. No.: 12/304,763

(22) PCT Filed: May 25, 2007

(86) PCT No.: PCT/EP2007/055106

§ 371 (c)(1), (2), (4) Date: Dec. 13, 2008

(87) PCT Pub. No.: WO2007/144254

PCT Pub. Date: Dec. 21, 2007

(65) Prior Publication Data

US 2009/0248273 A1 Oct. 1, 2009

(30) Foreign Application Priority Data

Jun. 16, 2006 (DE) ......................... 10 2006 027 823

(51) Int. Cl.
*B60T 7/12* (2006.01)

(52) U.S. Cl. ......................... 701/105; 701/114; 123/478

(58) Field of Classification Search .......... 701/103-106, 701/114, 115; 123/472, 478, 480, 490
See application file for complete search history.

(56) References Cited

U.S. PATENT DOCUMENTS

| | | | | |
|---|---|---|---|---|
| 6,684,850 | B2 * | 2/2004 | Kowatari et al. | 123/399 |
| 6,997,161 | B2 * | 2/2006 | Fuwa et al. | 123/345 |
| 7,107,946 | B2 * | 9/2006 | Lewis et al. | 123/90.11 |
| 7,128,043 | B2 * | 10/2006 | Lewis et al. | 123/198 F |
| 7,174,880 | B2 * | 2/2007 | Henn et al. | 123/436 |
| 7,209,824 | B2 * | 4/2007 | Henn et al. | 701/103 |
| 2003/0062027 | A1 | 4/2003 | Joos et al. | 123/478 |
| 2006/0047405 | A1 | 3/2006 | Bouchain et al. | 701/104 |

FOREIGN PATENT DOCUMENTS

| | | | |
|---|---|---|---|
| DE | 199 36 944 | A1 | 2/2001 |
| DE | 199 45 618 | A1 | 3/2001 |
| DE | 101 48 217 | C1 | 4/2003 |
| DE | 199 57 732 | B4 | 5/2004 |
| DE | 102 57 686 | A1 | 7/2004 |
| DE | 103 11 011 | A1 | 9/2004 |
| DE | 103 17 654 | A1 | 12/2004 |
| DE | 103 40 975 | A1 | 3/2005 |
| DE | 103 49 883 | A1 | 6/2005 |
| DE | 10 2004 051 405 | A1 | 5/2006 |
| EP | 1 138 919 | A1 | 10/2001 |
| WO | WO 03/031787 | A1 | 4/2003 |

* cited by examiner

*Primary Examiner* — John T Kwon
(74) *Attorney, Agent, or Firm* — King & Spalding L.L.P.

(57) ABSTRACT

The method and the device serve to adapt the valve characteristic of a fuel injection valve, which has a piezoelectrically driven nozzle needle and by which fuel is injected directly into the combustion chamber of an internal combustion engine, to production-related or age-related variations in the injection behavior. The activation energy and the needle stroke of the fuel injection valve are controlled in such a way that the engine torque in the case of a fuel injection valve with a reference characteristic would not vary. Here, if an actually occurring variation in the engine torque is detected, then by varying the gradient of the activation-energy/valve-stroke characteristic curve of the fuel injection valve, the engine torque is matched to the engine torque generated with an injection valve with a reference characteristic.

12 Claims, 3 Drawing Sheets

METHOD AND DEVICE FOR ADAPTING THE VALVE CHARACTERISTIC OF A FUEL INJECTION VALVE

CROSS-REFERENCE TO RELATED APPLICATIONS

This application is a U.S. National Stage Application of International Application No. PCT/EP2007/055106 filed May 25, 2007, which designates the United States of America, and claims priority to German Application No. 10 2006 027 823.2 filed Jun. 16, 2006, the contents of which are hereby incorporated by reference in their entirety.

TECHNICAL FIELD

The invention relates to a method or a device for adapting the valve characteristic of a fuel injection valve, which has a piezoelectrically driven nozzle needle and through which fuel is injected directly into the combustion chamber of an internal combustion engine, wherein the operating state of the internal combustion engine is monitored using sensors and the valve characteristic is adapted to production-related or age-related changes of its injection behavior.

BACKGROUND

In a method for adapting an injection valve characteristic of an activated fuel injection valve of an internal combustion engine to age-related changes of its actual injection behavior (DE 102 57 686 A1), the injection valve is intermittently activated during an operating state of the internal combustion engine which does not require any fuel injection, while otherwise no fuel injection occurs. At least one working cycle with activation follows or precedes a working cycle without activation of the injection valve. One speed value of the internal combustion engine is detected in each case for the working cycle with activation and for at least one of the working cycles without activation, a difference of the detected values is calculated, and a correction of the injection characteristic is thus performed.

Dosing the injected fuel quantity precisely is of decisive significance for the exact control of internal combustion engines. The injected quantity is a function of the parameters opening duration and needle stroke in modern piezo injection valves having direct drive. In the above-mentioned method, only the opening duration of the injection valve is adapted to age-related changes of the injection behavior.

SUMMARY

According to various embodiments, a method for adapting the valve characteristic or valve characteristic curve of a fuel injection valve can be provided, in which the needle stroke of the injection valve is adapted to age-related changes of the injection behavior.

According to an embodiment, a method for adapting the valve characteristic of a fuel injection valve, which has a piezoelectrically driven nozzle needle and through which fuel is injected directly into the combustion chamber of an internal combustion engine, may comprise the steps of: monitoring the operating state of the internal combustion engine using sensors and adapting the valve characteristic to production-related or age-related changes of its injection behavior, wherein the activation energy and the needle stroke of the fuel injection valve been controlled in such a way that the engine torque would not change with a fuel injection valve having reference characteristic, by the steps: —detecting an actually occurring change of the engine torque, and—adapting the engine torque to the engine torque generated by an injection valve having reference characteristic by changing the slope of the activation energy/needle stroke characteristic curve of the fuel injection valve, —if a reduction of the torque output by the internal combustion engine is established upon an increase of the needle stroke and a simultaneous decrease of the activation time, enlarging the needle stroke by reducing the slope of the valve characteristic curve.

According to a further embodiment, if an increase of the torque output by the internal combustion engine is established upon an increase of the needle stroke and a simultaneous decrease of the activation time, the needle stroke can be decreased by increasing the slope of the valve characteristic curve. According to a further embodiment, if a reduction of the torque output by the internal combustion engine is established upon a decrease of the needle stroke and a simultaneous increase of the activation time, the needle stroke can be enlarged by reducing the slope of the valve characteristic curve. According to a further embodiment, if an increase of the torque output by the internal combustion engine is established upon a decrease of the needle stroke and a simultaneous increase of the activation time, the needle stroke can be decreased by increasing the slope of the valve characteristic curve. According to a further embodiment, the valve characteristic can be adapted at various values of the rail pressure. According to a further embodiment, an adaptation of the valve characteristic curve can be performed in that the minimal energy at which a valve just opens is determined. According to a further embodiment, the activation energy can be increased step-by-step in overrun of the engine, beginning with a very small energy, which reliably does not yet open the valve, until a torque increase of the engine is recognized for the first time.

According to another embodiment, a device for adapting the valve characteristic of a fuel injection valve which has a piezoelectrically driven nozzle needle and through which fuel is injectable directly into the combustion chamber of an internal combustion engine, may be operable to monitor the operating state of the internal combustion engine using sensors and to adapt the valve characteristic to production-related or age-related changes of its injection behavior, and wherein— the device having a control unit, the activation energy and the needle stroke of the fuel injection valve being activatable by the control unit in such a way that the engine torque would not change with a fuel injection valve having reference characteristic, —at least one of the sensors detecting an actually occurring change of the engine torque, and—the device having means for changing the slope of the activation energy/needle stroke characteristic curve of the fuel injection valve to adapt the engine torque to the engine torque generated using an injection valve having reference characteristic, wherein the device is further operable: —if an increase of the torque output by the internal combustion engine is established upon an increase of the needle stroke and a simultaneous decrease of the activation time, to reduce the needle stroke by decreasing the slope of the valve characteristic curve.

According to a further embodiment, if a decrease of the torque output by the internal combustion engine is established upon an increase of the needle stroke and a simultaneous decrease of the activation time, the needle stroke can be enlarged by decreasing the slope of the valve characteristic curve.

BRIEF DESCRIPTION OF THE DRAWINGS

Exemplary embodiments of the invention are explained hereafter on the basis of the schematic drawings. In the figures.

DETAILED DESCRIPTION

In this method, the activation energy and the needle stroke of the fuel injection valve are controlled in such a way that the engine torque would not change with a fuel injection valve having reference characteristic; an actually occurring change of the engine torque is detected and the engine torque is adapted to the engine torque generated using an injection valve having reference characteristic by changing the slope of the activation energy/needle stroke characteristic curve of the fuel injection valve.

The advantages of the various embodiments are in particular that a more precise control of the combustion is made possible by the adaptation of the activation energy/needle stroke characteristic curve of piezo injection valves having direct drive to mass-production deviations and other tolerances. The fuel consumption may thus also be reduced.

Figure 1:
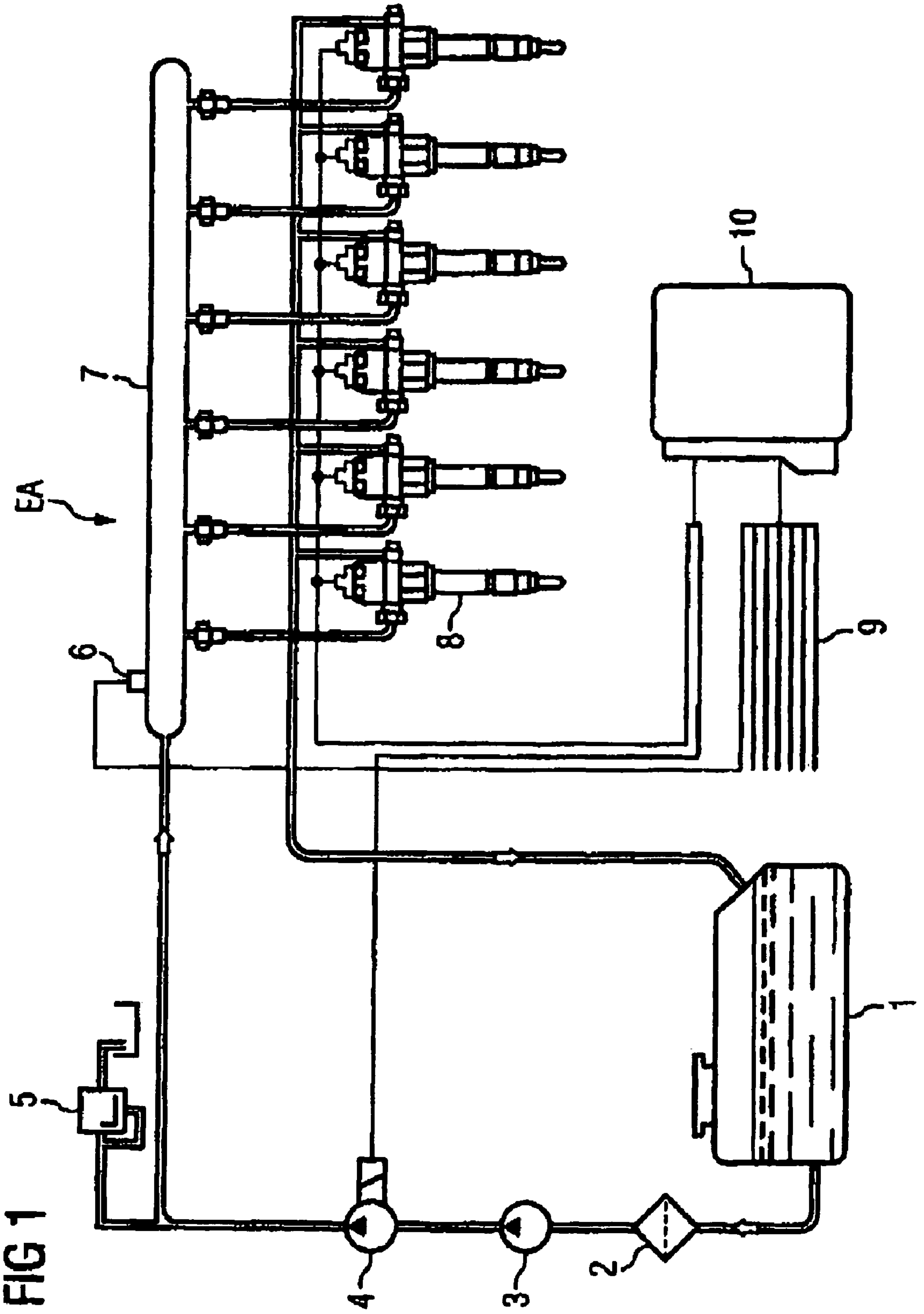
FIG. 1 shows an injection system for a motor vehicle engine, in which the method according to an embodiment is applied, in a schematic illustration.

An injection system EA for a motor vehicle engine, in particular a diesel engine, comprises a fuel tank 1, from which fuel is suctioned by a pre-supply pump 3 via a filter 2 (FIG. 1). The fuel delivered by the pre-supply pump 3 is compressed by a high-pressure supply pump 4 to a high pressure of approximately 1500 bar. The pressurized fuel is introduced into a common rail 7, at which a pressure sensor 6 detects the pressure of the fuel. The pressure in the common rail 7 is set via a pressure regulating valve 5, which lets off excess fuel via lines (only indicated) into the fuel tank 1. In the present example, six injection nozzles or injection valves 8 are connected to the common rail 7. The injection nozzles 8 also have a leakage drain 11, via which excess fuel is returned to the fuel tank 1, in addition to the high-pressure connection to the common rail 7. An injection valve 8 may particularly contain a piezoelectric actuator, which is not shown in greater detail here, because it is known per se (see, for example, DE 10 2004 051 405 A1).

The injection system EA is monitored and controlled by a control unit 10, which is connected to the high-pressure supply pump 4 to control it, and which analyzes the measured values of the pressure sensor 6. The control unit 10 is additionally connected to the outputs of further sensors 9. The injection nozzles 8 are also controlled by the control unit 10. The construction of an injection system of this type is described in Patent Specification DE 199 57 732 B4.

Figure 2:
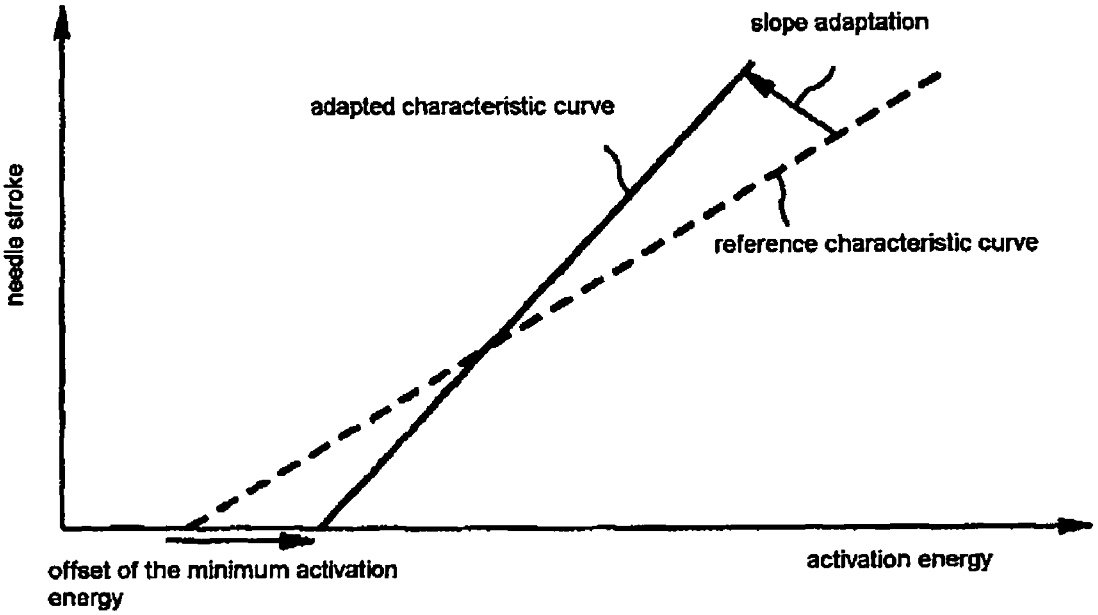
FIG. 2 shows a diagram to explain the method according to an embodiment.

In the diagram of FIG. 2, the activation energy of an injection valve 8 is plotted on the abscissa and the needle stroke is plotted on the ordinate, i.e., the stroke of the nozzle needle of the injection valve or the injection nozzle 8. The energy for actuating the nozzle needle is referred to as the activation energy here. The reference or nominal characteristic curve of an error-free injection valve is shown by a dashed line and an adapted characteristic curve according to an embodiment is shown by a solid line.

The needle stroke of a modern piezo injection valve having direct drive is a function of the energy of the activation. The needle stroke rises with rising energy. The adaptation of the valve characteristic (or the valve characteristic curve) to production-related or age-related changes of the actual injection behavior of the valve—referred to hereafter as adaptation for short—and thus the adaptation of the needle stroke is performed by monitoring the engine sensors (for speed, combustion pressure, knock sensor), and also by analyzing the sensor signals, and by changing the activation energy. The opening duration of the valve is presumed to be known by measurement or adaptation.

The adaptation is based on the finding that a predefined fuel injection quantity may be implemented in various ways. The injection quantity may be implemented using a short duration of the injection and a large needle stroke or a longer duration and a small needle stroke. Correspondingly, there are two methods for the adaptation here.

Firstly, at a constant operating point, if the needle stroke is increased for one or more injections while simultaneously reducing the injection time, and if a reduction of the torque results (by reduction of the engine speed or the combustion pressure), the valve characteristic curve, which models the relationship between activation energy and needle stroke, may be adapted using this information. For the case of a rising needle stroke and falling torque, the characteristic curve is changed in such a way that the needle stroke is enlarged, by reducing the slope of the characteristic curve.

It is to be noted that the activation time is decreased simultaneously with the increase of the valve stroke. For a reference valve, no torque or speed change would result and no adaptation would occur. The torque or the speed also changes only if the valve deviates from the reference valve because of tolerances or wear. In the described case, the torque and/or the speed drops. It is thus necessary to correct the slope of the characteristic curve downward. The slope of the characteristic curve is expediently changed in that the characteristic curve is pivoted around the point of intersection of the reference characteristic curve and the adapted characteristic curve. This corresponds to an offset of the minimum activation energy in the ordinate axis.

In contrast, if it is established that the torque rises because of the valve tolerances, the adaptation is to be performed in that the slope of the characteristic curve is corrected upward (see FIG. 2). A greater valve tolerance means, for example, that the injection opening of the valve is larger than intended, whereby more fuel is injected.

In a variant of the method according to an embodiment, the valve stroke is decreased and the activation time is increased, so that the torque of the engine also would remain constant here with a reference valve. As a result of the actually existing valve tolerances, one of the results described above may occur: in the event of positive valve tolerances, the torque increases and in the event of negative valve tolerances, the torque decreases. If the torque decreases, this requires a decreasing slope of the valve characteristic curve.

In contrast, if the torque rises because of valve tolerances, this results in an increase of the slope of the valve characteristic curve.

Is to be taken into consideration that the efficiency of the combustion may change if the identical fuel quantity is injected, but in a shorter time. The reason for this is a changed fuel preparation. In addition, changes of the rail pressure, i.e., the pressure in the common rail 7, may have an effect on the adaptation values, so that the adaptation is to be performed at various rail pressures. The method is preferably performed cylinder-selectively to adapt each valve individually. In addition, the slope of the activation energy/needle stroke characteristic curve may be corrected in each point using an adaptation. This means that a characteristic curve may also be adapted if it is composed of multiple characteristic curve parts.

A second adaptation method comprises determining the zero crossing of the characteristic curve, i.e., the minimum energy, at which a valve just opens. For this purpose, the activation energy is increased step-by-step in overrun (i.e., with shutdown injection), beginning with a very small energy, which reliably does not yet open the valve. The minimum activation energy is reached when a torque increase of the engine is recognized for the first time. The recognition is performed with the aid of speed, combustion pressure, or knocking sensors. The adaptation is also expediently performed here cylinder-selectively and at various rail pressures.

The adapted activation energy/needle stroke characteristic curve, i.e., the valve characteristic curve adapted to the actual state of the injection valve 8, is completely determined using each of the two methods.

Figure 3:
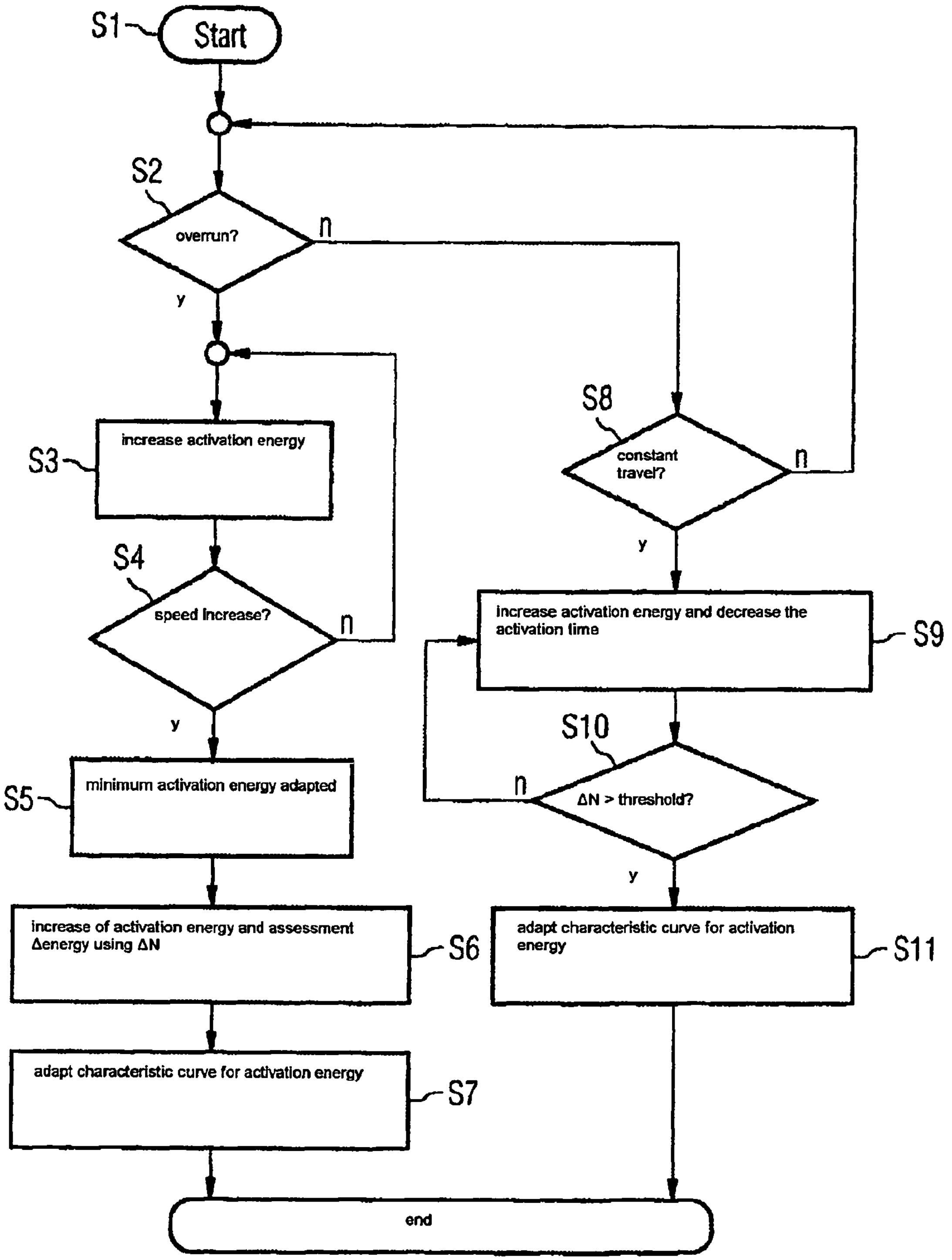
FIG. 3 shows a flowchart illustration of this method.

The method shown in the flowchart of FIG. 3 has the following steps $S_i$:

S1 after the start of the method, in a step

S2 it is queried whether the engine is in overrun. If so, in a step

S3 the activation energy is increased. Then, in a step

S4 it is queried whether the engine speed has increased. If not, the sequence jumps back to step S3. If so, in a step

S5 the minimum activation energy is adapted, i.e., changed (see FIG. 2). Then, in a step

S6 the activation energy is increased and this change ΔE of the energy is assessed with the change ΔN of the speed. (The assessment is explained following this flowchart.)

Then, in a step

S7 the slope of the characteristic curve for the activation energy is adapted.

If the response to the query in step S2 is no, in a step

S8 it is queried whether a constant travel velocity exists. If so, in a step

S9 the activation energy is increased and the activation time is decreased.

If the response to the query in step S8 is no, the sequence jumps back to step S2.

Then, in a step

S10 it is queried whether the speed change is greater than a predefined threshold. If not, the sequence jumps back to step S9. If so, in a step

S11 the slope of the characteristic curve is adapted for the activation energy. After step S7 on the one hand and step S11 on the other hand, a program run has reached its end.

The program is cyclically executed continuously.

The assessment in step S6 is performed as follows:

The activation energy is increased and the activation time is simultaneously decreased. With a reference valve, no change of the torque or speed would thus result. However, the speed decreases due to the tolerances or the wear of the existing valve, for example. One thus has the information that too little fuel was injected, and the slope of the characteristic curve must thus be corrected upward.

FIG. 2

Nadelhub = needle stroke
Steigungsadaption = slope adaptation
adaptierte Kennlinie = adapted characteristic curve
Referenzkennlinie = reference characteristic curve
Offset der minimalen Ansteuerenergie = offset of the minimal activation energy
Ansteuerenergie = activation energy

FIG. 3

| | |
|---|---|
| S1 | start |
| S2 | overrun? |
| n = no, j = yes | |
| S3 | increase activation energy |
| S4 | speed increase? |
| S5 | minimal activation energy adapted |
| S6 | increase of activation energy and assessment Δenergy using ΔN |
| S7 | adapt characteristic curve for activation energy |
| S8 | constant travel? |
| S9 | increase activation energy and decrease the activation time |
| S10 | ΔN > threshold? |
| S11 | adapt characteristic curve for activation energy |
| Ende = end | |

What is claimed is:

1. A method for adapting a valve characteristic of a fuel injection valve, which has a piezoelectrically driven nozzle needle and through which fuel is injected directly into the combustion chamber of an internal combustion engine, comprising the steps of:

storing a characteristic curve between activation energy for the fuel injection valve and needle stroke for the fuel injection valve;

implementing a particular needle stroke and a particular injection time for the fuel injection valve and determining a resulting first torque;

determining an adjusted needle stroke and an adjusted injection time calculated to provide the same torque as the first torque at a same operating point;

implementing the adjusted needle stroke and the adjusted injection time and determining a resulting second torque;

comparing the second torque to the first torque; and in response to determining that the second torque is not equal to the first torque, automatically adjusting the characteristic curve by adjusting a slope of a line relating the activation energy for the fuel injection valve and the needle stroke for the fuel injection valve.

2. The method according to claim 1, wherein if (a) the adjusted needle stroke and the adjusted injection time comprises an increased needle stroke and a decreased injection time, and (b) the second torque is determined to be greater than the first torque, the characteristic curve is adjusted by increasing the slope of the line relating the activation energy for the fuel injection valve and the needle stroke for the fuel injection valve.

3. The method according to claim 1, wherein if (a) the adjusted needle stroke and the adjusted injection time comprises a decreased needle stroke and an increased injection time, and (b) the second torque is determined to be less than the first torque, the characteristic curve is adjusted by decreasing the slope of the line relating the activation energy for the fuel injection valve and the needle stroke for the fuel injection valve.

4. The method according to claim 1, wherein if (a) the adjusted needle stroke and the adjusted injection time comprises a decreased needle stroke and an increased injection time, and (b) the second torque is determined to be greater than the first torque, the characteristic curve is adjusted by increasing the slope of the line relating the activation energy for the fuel injection valve and the needle stroke for the fuel injection valve.

5. The method according to claim 1, wherein an adaptation of the valve characteristic curve is performed to determine a minimum energy required to open a valve.

6. The method according to claim 5, wherein the activation energy is increased step-by-step in overrun of the engine until a torque increase of the engine is recognized for the first time.

7. A device for adapting a valve characteristic of a fuel injection valve which has a piezoelectrically driven nozzle needle and through which fuel is injectable directly into the combustion chamber of an internal combustion engine, wherein the device comprises:

a fuel injection valve;

one or more sensors; and a control unit operable to:

maintain a characteristic curve between activation energy for the fuel injection valve and needle stroke for the fuel injection valve;

implement a particular needle stroke and a particular injection time for the fuel injection valve and determine a resulting first torque based at least on input from the one or more sensors;

determine an adjusted needle stroke and an adjusted injection time calculated to provide the same torque as the first torque at a same operating point;

implement the adjusted needle stroke and the adjusted injection time and determine a resulting second torque based at least on input from the one or more sensors;

compare the second torque to the first torque; and in response to determining that the second torque is not equal to the first torque, automatically adjust the characteristic curve between the activation energy for the fuel injection valve and the needle stroke for the fuel injection valve.

8. The device according to claim 7, wherein if (a) the adjusted needle stroke and the adjusted injection time comprises an increased needle stroke and an decreased injection time, and (b) the second torque is determined to be greater than the first torque, the control unit adjusts the characteristic curve by increasing a slope of a line relating the needle stroke to the injection time.

9. The device according to claim 7, wherein if (a) the adjusted needle stroke and the adjusted injection time comprises a decreased needle stroke and an increased injection time, and (b) the second torque is determined to be less than the first torque, the control unit adjusts the characteristic curve by decreasing a slope of a line relating the needle stroke to the injection time.

10. The device according to claim 7, wherein if (a) the adjusted needle stroke and the adjusted injection time comprises a decreased needle stroke and an increased injection time, and (b) the second torque is determined to be greater than the first torque, the control unit adjusts the characteristic curve by increasing a slope of a line relating the needle stroke to the injection time.

11. The method according to claim 1, wherein if (a) the adjusted needle stroke and the adjusted injection time comprises an increased needle stroke and a decreased injection time, and (b) the second torque is determined to be less than the first torque, the characteristic curve is adjusted by decreasing a slope of a line relating the needle stroke to the injection time.

12. The device according to claim 7, wherein if (a) the adjusted needle stroke and the adjusted injection time comprises an increased needle stroke and a decreased injection time, and (b) the second torque is determined to be less than the first torque, the characteristic curve is adjusted by decreasing a slope of a line relating the needle stroke to the injection time.

* * * * *